Nov. 3, 1970   A. W. OBERHOFER   3,537,845
SEPARATION AND RECOVERY OF COBALT AND ZINC
Filed April 24, 1967   2 Sheets-Sheet 1
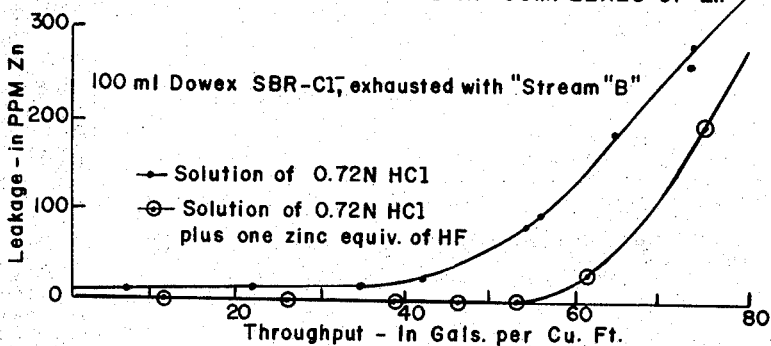
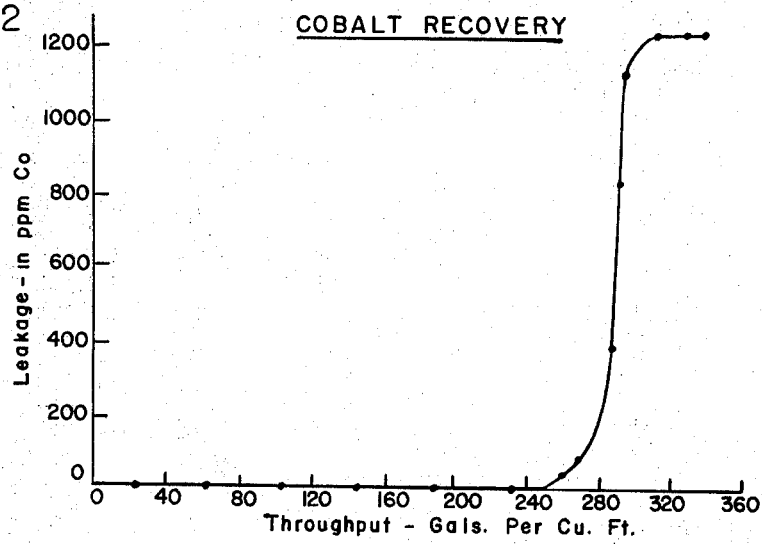
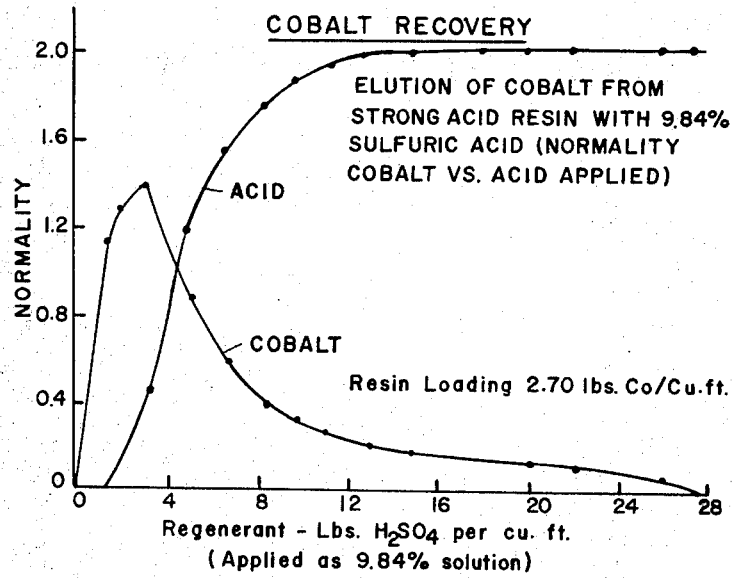
INVENTOR:
ALFRED W. OBERHOFER
BY
Marzall, Johnston, Cook & Root
ATT'YS Nov. 3, 1970 A. W. OBERHOFER 3,537,845
SEPARATION AND RECOVERY OF COBALT AND ZINC
Filed April 24, 1967 2 Sheets-Sheet 2
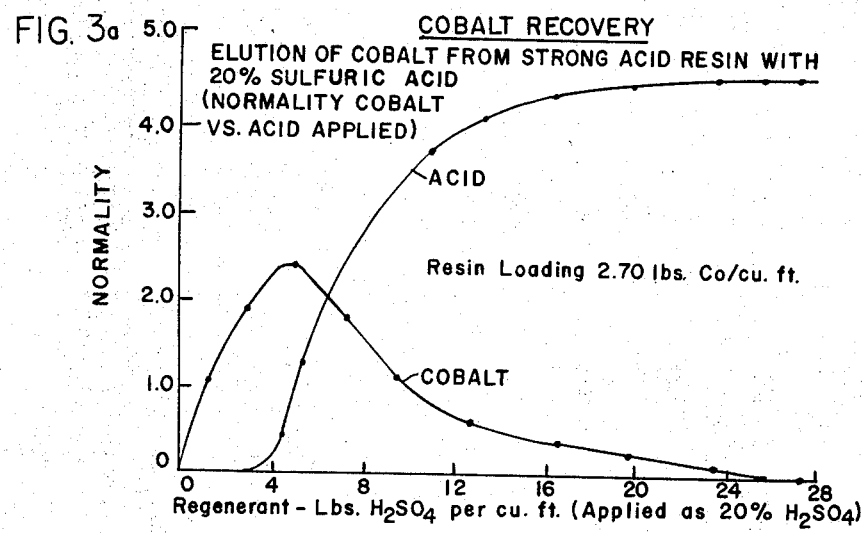
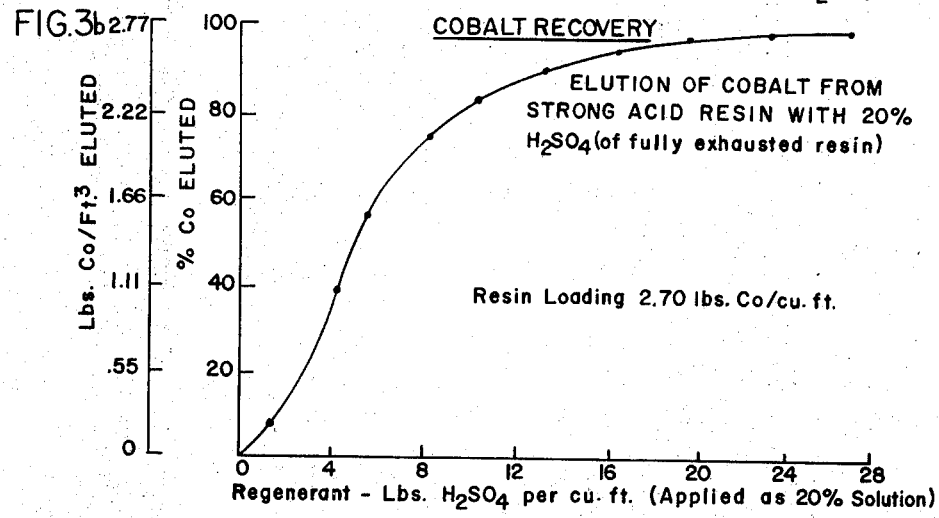
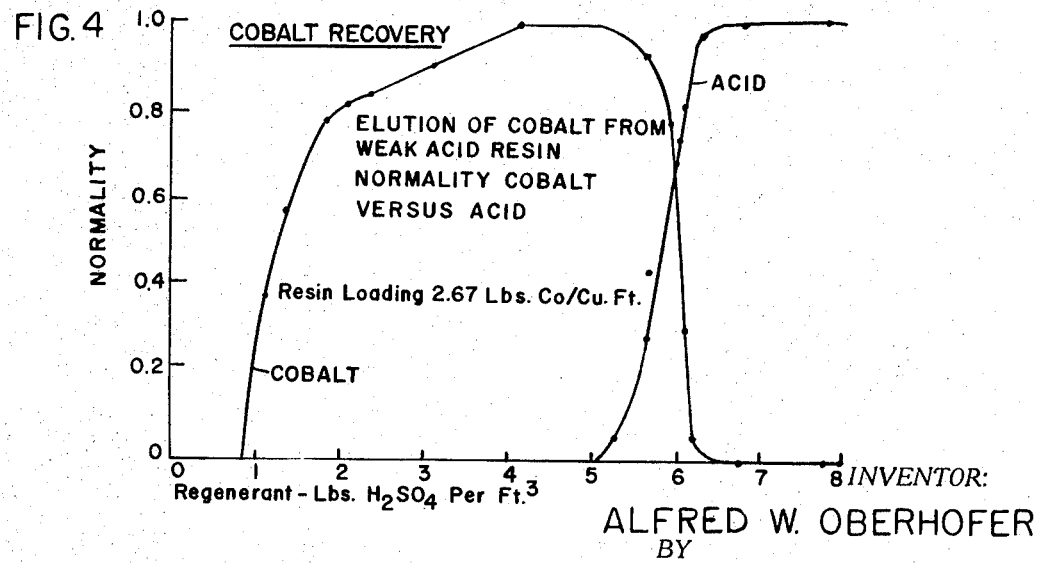
INVENTOR:
ALFRED W. OBERHOFER
BY
Marzall, Johnston, Cook & Root
ATT'YS

United States Patent Office

3,537,845
Patented Nov. 3, 1970

---

3,537,845
SEPARATION AND RECOVERY OF COBALT AND ZINC
Alfred W. Oberhofer, Alsip, Ill., assignor, by mesne assignments, to The Dow Chemical Company, a corporation of Delaware
Filed Apr. 24, 1967, Ser. No. 633,153
Int. Cl. C01g 9/04; C22b 19/00
U.S. Cl. 75—120                            3 Claims

---

ABSTRACT OF THE DISCLOSURE

A method of recovering catalyst components used in an oxo-alkylation process. In the process, cobalt and zinc catalysts are separated by converting zinc contained in a process stream to a complex anionic halide which is selectively sorbed on a strong base anion exchange resin. The complex anionic halide is formed by adding HCl and HF to the process streams. The zinc-free stream is placed in contact with a cation exchange resin in the $H^+$ form to remove cobalt which is then recovered from the cation exchange resin.

---

The present inventon relates to a novel catalyst recovery technique which can be used in the oxo-alkylation process. More particularly, the subject invention is directed to an improved process for recovering cobalt and zinc catalyst components from an oxo-alkylation process stream.

In the oxo synthesis a catalytic addition of carbon monoxide-hydrogen mixtures to olefins takes place at elevated temperatures and pressures. Aldehydes and/or alcohols are produced having one more carbon atom than the corresponding olefin. Cobalt containing compounds, and in particular cobalt carbonyl compounds, are generally used as catalysts in the process. Zinc also is frequently used as a catalyst component or is present in the catalyst system. In view of the value of the cobalt and zinc catalysts it is necessary to recover these materials if the process is to be carried out on a substantial scale. While various methods have been proposed for recovering cobalt and/or zinc, these methods have not been entirely successful.

It is an object of the present invention to provide an improved process for selectively removing zinc and cobalt from a solution containing these materials.

It is another object of the present invention to provide an improved method for recovering cobalt and/or zinc from a waste solution produced in an oxo-alkylation process.

It is a further object to provide an improved means to separate zinc from cobalt where both of these materials are present in a given solution along with various iron compounds.

In general, the present invention comprises the discovery that ion exchange materials can be used to advantage to recover cobalt and zinc from solutions such as waste solutions produced in an oxo-alkylation process. More specifically, it has been found that zinc can be separated from cobalt by complexing zinc with a combination of HCl and HF followed by passage of the complex-containing solution through a strong base anion exchange resin. The zinc complex is sorbed by the anion exchange resin, whereas the cobalt passes through with the effluent. Cobalt can be removed from the effluent through the use of a cation exchange resin in the $H^+$ form. The exchange resins can be freed from zinc and cobalt by several ways to be described below.

While it has been suggested that zinc can be separated from cobalt by a complex formation with HCl, no one to the best of my knowledge has previously taught the use of combined HCl and HF for this purpose. Unexpectedly, it was found that the combination of HCl and HF as a complexing agent provided much improved results over the use of HCl alone. Where HCl is added to a process stream containing both zinc and cobalt to obtain a normality of 0.72 N, and where that stream is then passed through an ion exchange resin, only partial separation of the zinc from the stream was obtained. After addition of HF to the stream containing 0.72 N HCl and passage of that stream through the same anion exchange resin, however, it was found that complete separation of zinc occurred and a capacity of 1.23 lbs. $Zn^{++}$ per cu. ft. of resin was observed to a zero leakage point.

In the process a strong base anion exchange resin is used to selectively sorb a zinc complex. Any of the commercially available strong base resins containing a quaternary ammonium type of structure can be used in the process. Most of these materials contain a polymeric benzyl and three methyl groups on the nitrogen atom of the resin, although one or more of the methyl groups can be replaced by other groups such as an ethanol group. The quaternary ammonium anion exchange resins are highly ionized and can be used over a wide pH range.

The cation exchange resins that can be used to remove cobalt from the zinc-free process stream include both strong acid and weak acid resins. Preferably, a strong acid cation exchange resin is employed. These resins are made by the nuclear sulfonation of styrene-divinylbenzene beads. Weakly acidic cation exchange resins containing carboxylic groups as the functional sites and chelate resins can be used but are somewhat less effective.

The invention can best be understood by reference to the following illustrative examples.

EXAMPLE 1

This example shows the separation of zinc from cobalt in a waste solution produced during the oxo-alkylation process and compares the present process with a process in which only HCl is used as a complexing agent. The waste stream contained the following components:

Stream B:
    Co, in p.p.m. _____ 3,480
    Zn, in p.p.m. _____ 2,800
    Fe, in p.p.m. _____   210
    pH _____  3.70

In a first experiment HCl was added to process stream B to obtain a 0.72 N HCl solution. The amount of acid added to the solution was 228 ml. of HCl (specific gravity 1.19) per gallon of solution. The solution was passed through a 100 ml. bed of Dowex SBR–Cl⁻ (a strong base anion exchange resin of the type described above) in a ½ inch I.D. tube of 30 inch bed height at a flow rate of 0.5 g.p.m/cu. ft. The effluent was collected and analyzed for zinc and cobalt. The results obtained are shown in the attached graph set out in FIG. 1.

The anion exchange resin column used above was rinsed with D.I. water at a flow rate of one-half of the exhaustion rate, or 0.25 gallon per minute per cu. ft. of resin. After rinsing with a total of 300 gallons per cu. ft. no zinc was found in the effluent.

In a second experiment process stream B described above was again acidified to 0.72 N HCl, but one equivalent amount of hydrofluoric acid per equivalent of zinc (17.0 g. of 49% HF per gallon of solution) was added to the stream. The stream was then passed through a 100 ml. bed of Dowel SBR–Cl⁻ (described above). The resin was exhausted at 7 ml. per minute (0.5 g.p.m./cu. ft.) flow rate at room temperature. The effluent was taken in fractions and analyzed. The results are shown in the graph set out in FIG. 1.

As is apparent from the graph, much improved results are obtained where HF is combined with HCl in complexing zinc. Where hydrofluoric acid was added to the solution of 0.72 N HCl zero leakage of zinc was obtained to 1.23 lbs. Zn/cu. ft. In contrast, leakage of approximately 20 p.p.m. zinc occurred throughout the exhaustion run where only a hydrochloric acid complex was formed.

The resin used in the second experiment was again fully water rinsed. 3.63 g. zinc per 100 ml. resin, or 2.26 lbs. of $Zn^{++}$ per cu. ft. of exhausted resin, was found in the rinse water (22 bed volumes).

EXAMPLE 2

In this example a zinc-free stream produced as shown above was treated to remove cobalt. The cobalt, zinc, and iron content of the stream and its pH were as follows:

Stream A:

| | |
|---|---|
| Cobalt, p.p.m. | 1,235 |
| Zinc, p.p.m. | 0 |
| Iron, p.p.m. | 80 |
| pH | 3.25–3.70 |

In these tests both strong acid and weak acid ion exchange resins were tried for the purpose of determing the resin best suited for maximum removal of cobalt from the solution and for efficient regeneration of the resin with sulfuric acid. The tests were carried out at temperatures of from 72–78° F. The pH of the solution (stream A) was adjusted to pH 6.0 with 1 N NaOH. A constant pH of the column feed was desired in order to establish comparable resin exhaustion data. The pH adjustment caused the formation of a small amount of precipitate. Analysis showed that 90–95% of the precipitate was iron.

In the first test, a 100 mls. quantity of Dowex HCR–W (a strong acid cation exchange resin made by the nuclear sulfonation of styrene-divinylbenzene beads) was placed in a ½ inch I.D. column, resulting in a 30 inch bed height. The resin was conditioned by alternately passing two portions of 500 ml. each 1 N NaOH and 1 N $H_2SO_4$ through the column, followed by passage of 1 liter 1 N $H_2SO_4$ and rinse to M-point. The column was exhausted with the test solution at pH 6.0 and at a flow rate of 26.7 ml. per minute, or 2 g.p.m./cu. ft. of resin. The column was exhausted to 100% breakthrough of cobalt. A shrinkage of approximately 8% was observed. The capacity and leakage curves are shown in FIG. 2 of the drawing. The resin exhibited a dark red-brown color after conversion to the cobalt form. The fully exhausted resin was then regenerated with 10% sulfuric acid, at a flow rate of 0.5 gallon per minute/cu. ft. After regeneration, the original color of the resin was restored. The regenerant effluent was collected in fractions where it was then analyzed for cobalt and acid. The data obtained during elution of cobalt are shown in FIG. 3, which illustrates the normality of cobalt versus acid in the spent regenerant fractions. The exhaustion of the resin with stream A was repeated after adjusting the pH of the feed solution to pH 3.25. The cobalt loaded resin was then regenerated with a 20% $H_2SO_4$ solution at a flow rate of 0.25 g.p.m./cu. ft. The results obtained from the elution are shown in FIGS. 3a and 3b. (Note: The capacity values obtained at this influent pH (3.25) was exactly the same as the one obtained at pH 6.0.)

In this experiment the same test was run using a weak acid cation exchange resin in place of the strong acid cation exchange resin in the carboxylic acid form. The resin was conditioned by alternately passing 500 ml. portions of 1 N $H_2SO_4$ and 1 N NaOH (two passes each) through the resin, with D.I. water rinses between acid and caustic. Finally, 1000 ml. 1 N $H_2SO_4$ was passed through the resin, followed by a D.I. water rinse to a zero mineral acidity end point. The resin was exhausted to a 100% cobalt breakthrough with the test solution at pH 6.0, at a flow rate of 6.7 ml. per minute, or 0.5 gallon per minute per cu. ft. of resin. The exhausted resin was regenerated with 1.03 N sulfuric acid, at a flow rate of 0.5 g.p.m./cu. ft. The spent regenerant was collected and analyzed for cobalt and acid. The values obtained are shown in FIG. 4. FIG. 4 shows the values in percent and pounds of cobalt eluted versus the amount of acid applied. Approximately 85% of the total cobalt is recovered in a neutral solution before the spent regenerant becomes acidic.

During the separation of zinc from cobalt shown in Example 1, relatively high anion exchange resin loadings with zinc were obtained. The total exchange capacity of Dowex SBR, on a backwashed and settled basis, is 1.20 meq./ml. of resin. The zinc loadings obtained were 1.80 to 1.85 meq./ml. of resin, or 50% higher if the zinc complexes formed with halides were all divalent. This may permit the speculation that a mixture of divalent and monovalent zinc complexes may exist, due to the halide concentration in the aqueous phase and in the solid phase within the anion resin particles.

Examples: $[ZnCl_2F(H_2O)]^-$ and $[ZnCl_3F]^{--}$

The resin loading characteristics with zinc can be greatly improved if very low flow rates are applied during the separation. This is of particular value if only one column is used and complete absence of zinc in the purified effluents is desired. For example, a resin capacity of 2.70 lbs. of zinc per cu. ft. of resin was obtained (to first leakage of zinc) when a column was operated at 0.015 g.p.m./ft.$^3$, while only 1.23 lbs. of zinc per cu. ft. of resin was removed to first leakage of zinc during operation at 2 g.p.m./ft.$^3$ flow rate (see FIG. 1).

If operation of columns in series is practiced, a substantial increase in resin utility is possible, since any leakage of zinc through the first column can be removed by the following columns. An added advantage of this type of operation is that continuous operation is possible, i.e., one column can be regenerated while the remaining columns are still left in operation. This advantage, of course, also applies to the subsequent removal of cobalt from the solution (free of zinc) by cation exchange resins.

Rinse water requirements and time for rinse regeneration of zinc loaded resins can be somewhat reduced by using hot water, to which a small amount of acid is added (for example, acidified to 0.01 N HCl). The water is applied at 0.5 g.p.m./cu. ft. flow rate. When acidified and hot (180° F.) water was used, 270 gallons per cu. ft. of resin were required for complete zinc removal, which compares to 330 gallons required with cold, pure D.I. water. A mixture of ammonium hydroxide and ammonium chloride solution reduced rinse requirements to 115 gallons. The acids that can be used to acidify the water include HCL, $HNO_3$, $H_2SO_4$, HF, HI, etc. Ordinarily, enough acid is used to lower the pH of the solution to from about 0.001 to about 0.1 N.

The analytical data obtained from column effluents during a typical separation run of zinc from cobalt revealed no great differences in conductance, pH, chloride or hydrogen ion concentration. The only significant difference is found in the zinc concentration. Future unit control in industrial installations would have to center on zinc leakage as the measurement for unit shut off.

Cation resin effluents showed appreciable differences in pH values during breakthrough of cobalt ions, when the cation resin is operated with neutralized (caustic treated) solutions. When operated with acidic and diluted solutions, the pH values during cobalt breakthrough show only little or no differences, i.e., too small for practical control of field unit operations. The column effluents, however, show the distinctive pink to red color of cobalt salts during breakthrough, and monitoring by color readings with a photometer is possible (spectral transmission with filters in the range of 420 to 540 millicrons).

Removal of cobalt by strong acid cation exchange resin from a mixture of process streams A and B, the latter containing 0.72 N HCl and 0.11 N HF, and neutralized with NaOH to pH 5.0 and pH 3.0, resulted in a low resin capacity and high cobalt leakage when operated at pH 5.0; at pH 3.0 influent the capacity improved greatly. To first leakage of cobalt, the influent pH 5.0 resulted in a capacity of 0.87 lb. Co/ft.$^3$, while a pH 3.0 influent provided a capacity of 1.73 lbs. of Co/ft.$^3$.

Dilution of the unneutralized, i.e. acidic mixture at a ratio of 1:3 with D.I. water and passage through the resin at a flow rate of 2 g.p.m./ft.$^3$ resulted in a capacity of 4.08 lbs. of cobalt per cu. ft. to first leakage, or a total resin loading of 5.12 lbs. of cobalt/ft.$^3$. This capacity corresponds to 53% more cobalt loading over the actual available exchange capacity, if all cobalt ions were divalent.

Dilution of the mixture neutralized to pH 5.0 at a 1:3 ratio with D.I. water and passage through the resin at 2 g.p.m./ft.$^2$ resulted in a total resin loading of 3.25 lbs. Co per cu. ft. of resin.

Operation of the cation resin at reduced flow rates, or 0.015 g.p.m./ft.$^3$ showed greatly improved cobalt loading characteristics, resulting in lower cobalt leakage and sharper breakthrough when compared to operation at 2 g.p.m./ft.$^3$.

In separating zinc from cobalt in accordance with the present process a sufficient amount of HCl is added to the process stream to produce a normality of from 0.3 N to 3.0 N. The amount of HF added to the stream can vary from 1 equivalent to 3 equivalents per equivalent of zinc, based on the amount of zinc that must be complexed.

In carrying out the sorption of cobalt from the zinc-free stream, the pH of the stream should be adjusted to from 1.0 to 6.35. The pH adjustment above pH 5 causes a precipitation of iron. Ordinarily, the pH of the solution will be raised to the desired range through the addition of an alkali such as NaOH, KOH, or the like.

The acidic solution can also be diluted with water, which necessarily increases the pH of the water.

Obviously many modifications and variations of the invention as hereinbefore set forth may be made without departing from the spirit and scope thereof, and therefore only such limitations should be imposed as are indicated in the appended claims.

I claim:

1. A process for selectively separating zinc from a waste stream formed in the oxo-alkylation process, said stream containing both zinc and cobalt which comprises: adding to said stream both HCl and HF, whereby said zinc is converted to a complex anionic halide; and thereafter passing said stream through a strong base anion exchange resin, whereby said zinc is selectively sorbed on said strong base anion exchange resin.

2. A process as in claim 1 wherein the amount of HCl added to the solution is sufficient to provide a normality of from 0.3 N to 3.0 N.

3. A process as in claim 2 wherein the amount of HF added to the solution is from 1 equivalent to 3 equivalents based on the amount of zinc in said solution.

References Cited

J. W. Mellor's: "A Comprehensive Treatise on Inorganic and Theoretical Chemistry," vol. 14, 1935 ed., pages 616 and 617. Longmans, Green & Co., New York.

"Ion Exchange Separations in Aanalytical Chemistry," by Olaf Samuelson, 1963 ed., pages 391, 393, 395–398.

EDWARD STERN, Primary Examiner

U.S. Cl. X.R.

23—50, 55, 97; 75—119